United States Patent
Hahn et al.

(10) Patent No.: US 10,305,165 B2
(45) Date of Patent: May 28, 2019

(54) MOBILE TERMINAL

(71) Applicant: LG ELECTRONICS INC., Seoul (KR)

(72) Inventors: Sangwook Hahn, Seoul (KR); Sukho Hong, Seoul (KR); Sungho Hong, Seoul (KR); Jaewook Lee, Seoul (KR); Timothy Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 350 days.

(21) Appl. No.: 15/184,615

(22) Filed: Jun. 16, 2016

(65) Prior Publication Data
US 2017/0133746 A1 May 11, 2017

(30) Foreign Application Priority Data

Nov. 10, 2015 (KR) ........................ 10-2015-0157640

(51) Int. Cl.
*H01Q 1/24* (2006.01)
*H01Q 1/50* (2006.01)
*H04M 1/02* (2006.01)

(52) U.S. Cl.
CPC .............. *H01Q 1/243* (2013.01); *H01Q 1/50* (2013.01); *H04M 1/0202* (2013.01); *H04M 1/026* (2013.01); *H04M 1/0283* (2013.01)

(58) Field of Classification Search
CPC .......... H01C 1/243; H01Q 1/50; H01Q 1/243; H04M 1/0202; H04M 1/026; H04M 1/0283
See application file for complete search history.

(56) References Cited

U.S. PATENT DOCUMENTS

| | | | |
|---|---|---|---|
| 2014/0125528 A1 | 5/2014 | Tsai et al. | |
| 2015/0050968 A1 | 2/2015 | Jeon et al. | |
| 2015/0241921 A1* | 8/2015 | Gu ..................... | H04M 1/0202 |
| | | | 361/679.56 |
| 2016/0116948 A1 | 4/2016 | Ou et al. | |

FOREIGN PATENT DOCUMENTS

| | | |
|---|---|---|
| CN | 104540340 A | 4/2015 |
| CN | 104540341 A | 4/2015 |
| EP | 2838157 A | 2/2015 |
| EP | 2913988 A1 | 9/2015 |
| EP | 3021559 A1 | 5/2016 |

* cited by examiner

*Primary Examiner* — Graham P Smith
*Assistant Examiner* — Jae K Kim
(74) *Attorney, Agent, or Firm* — Birch, Stewart, Kolasch & Birch, LLP

(57) ABSTRACT

A mobile terminal including a case; a display unit arranged in a front of the case; and a wireless communication unit mounted in the case and configured to provide wireless communication. Further, the case includes a first metallic part; a second metallic part spaced apart a predetermined distance from the first metallic part; a floating metallic part provided between the first metallic part and the second metallic part, the floating metallic part being spaced apart a predetermined distance from the first metallic part and the second metallic part; and a non-metallic part provided between the first metallic part and the floating metallic part and between the floating metallic part and the second metallic part.

7 Claims, 10 Drawing Sheets

(a)

(b)

(c)

(d)

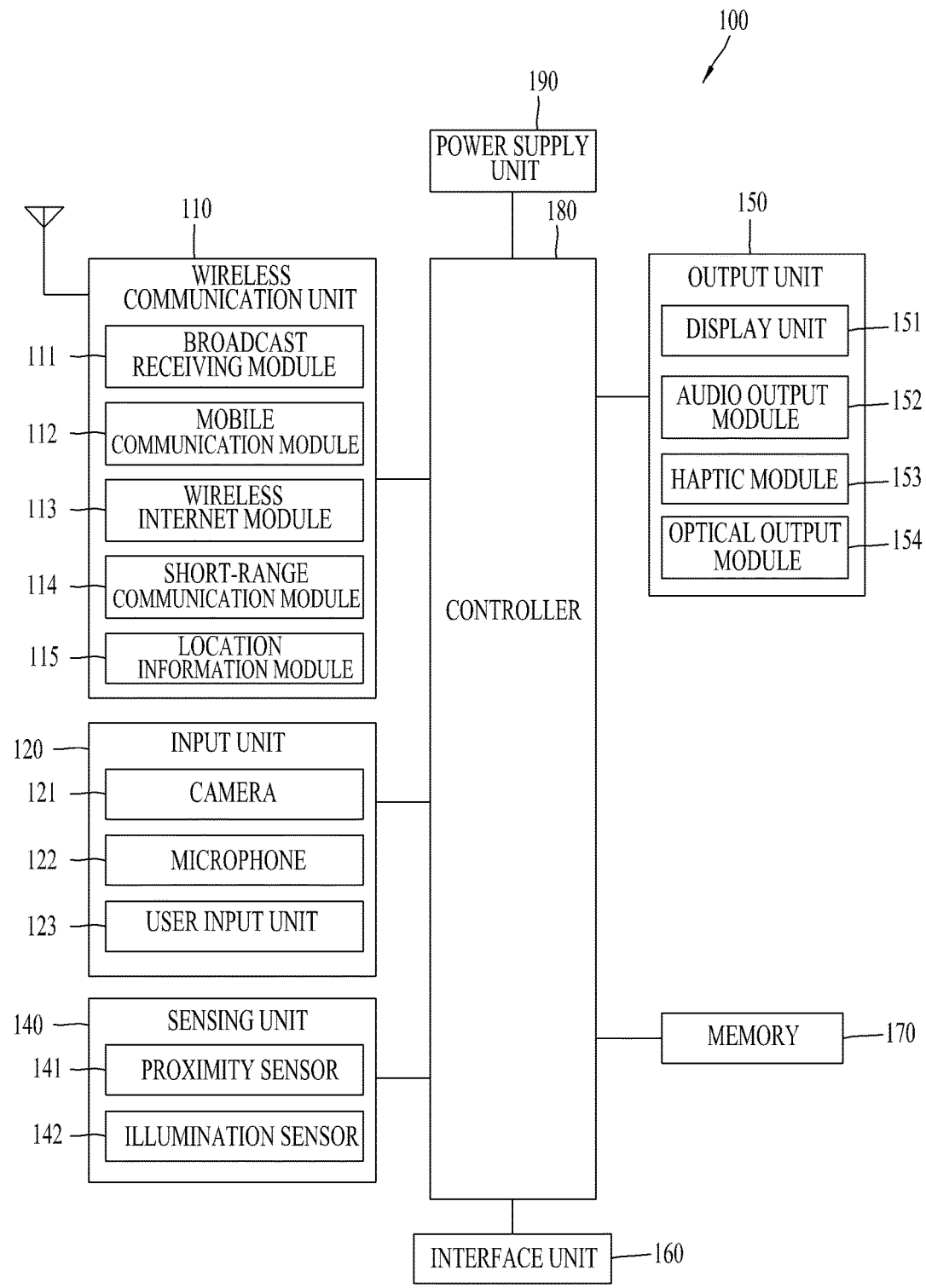

(a)

(b)

(a)

(b)

(a)

(b)

MOBILE TERMINAL

CROSS-REFERENCE TO RELATED APPLICATIONS

This application claims priority to Korean Patent Application No. 10-2015-0157640 filed on Nov. 10, 2015 in Korea, the entire contents of which is hereby incorporated by reference in its entirety.

BACKGROUND OF THE DISCLOSURE

Field of the Disclosure

Embodiments of the present disclosure relate to a mobile terminal including a metal case which may improve an exterior appearance and performance.

Background of the Disclosure

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display.

Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

As such the mobile terminals are used as multimedia devices, design factors become important as well as hand-carry functions. Ultra-slim and simple design mobile terminals are popular and an exterior design of such a mobile terminal can be improved, using a metal case.

However, the metal case affects performances of the components using electromagnetic waves such as an antenna. Accordingly, a non-conductive material has to be mixedly used for the metal case so that the exterior design with uniformity and the antenna performance might conflicts with each other disadvantageously.

SUMMARY OF THE DISCLOSURE

An object of the present disclosure is to provide a mobile terminal which has unity by minimizing an exposed non-conductive material of a case.

Embodiments of the present disclosure provide a mobile terminal including a case including a metallic material and a non-metallic material; and a wireless communication unit mounted in the case and configured to implement wireless communication with an external terminal or a base station, wherein the case includes a first metallic part comprising one end having a first inclined surface toward a direction of the thickness; a second metallic part comprising a second inclined surface facing the first inclined surface, the second metallic part spaced apart a predetermined distance from the first metal part; and a transparent non-metallic part provided between the first metallic part and the second metal part.

Embodiments of the present disclosure may provide a mobile terminal including a case including a metallic material and a non-metallic material; and a wireless communication unit mounted in the case and configured to implement wireless communication with an external terminal or a base station, wherein the case includes a first metal part; a second metallic part spaced apart a predetermined distance from the first metal part; a floating metallic part provided between the first metallic part and the second metal part, the floating metallic part spaced apart a predetermined distance from the first metallic part and the second metal part; and a non-metallic part provided between the first metallic part and the floating metallic part and between the floating metallic part and the second metal part.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

FIG. 1A is a block diagram illustrating a mobile terminal in accordance with an embodiment of the present disclosure;

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
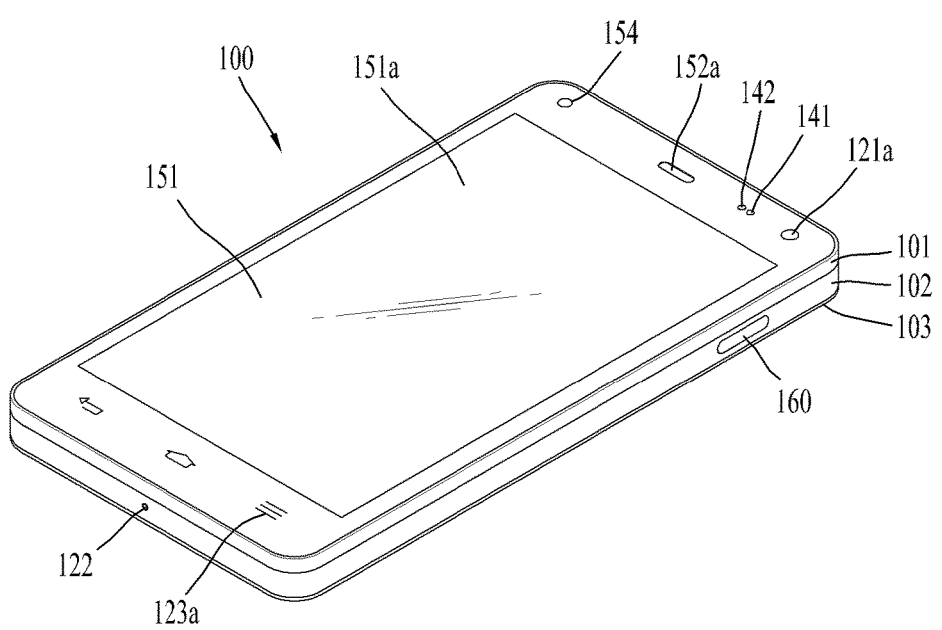
FIGS. 1B and 1C are conceptual diagrams of one example of the mobile terminal, viewed in different sides.
Figure 1C:
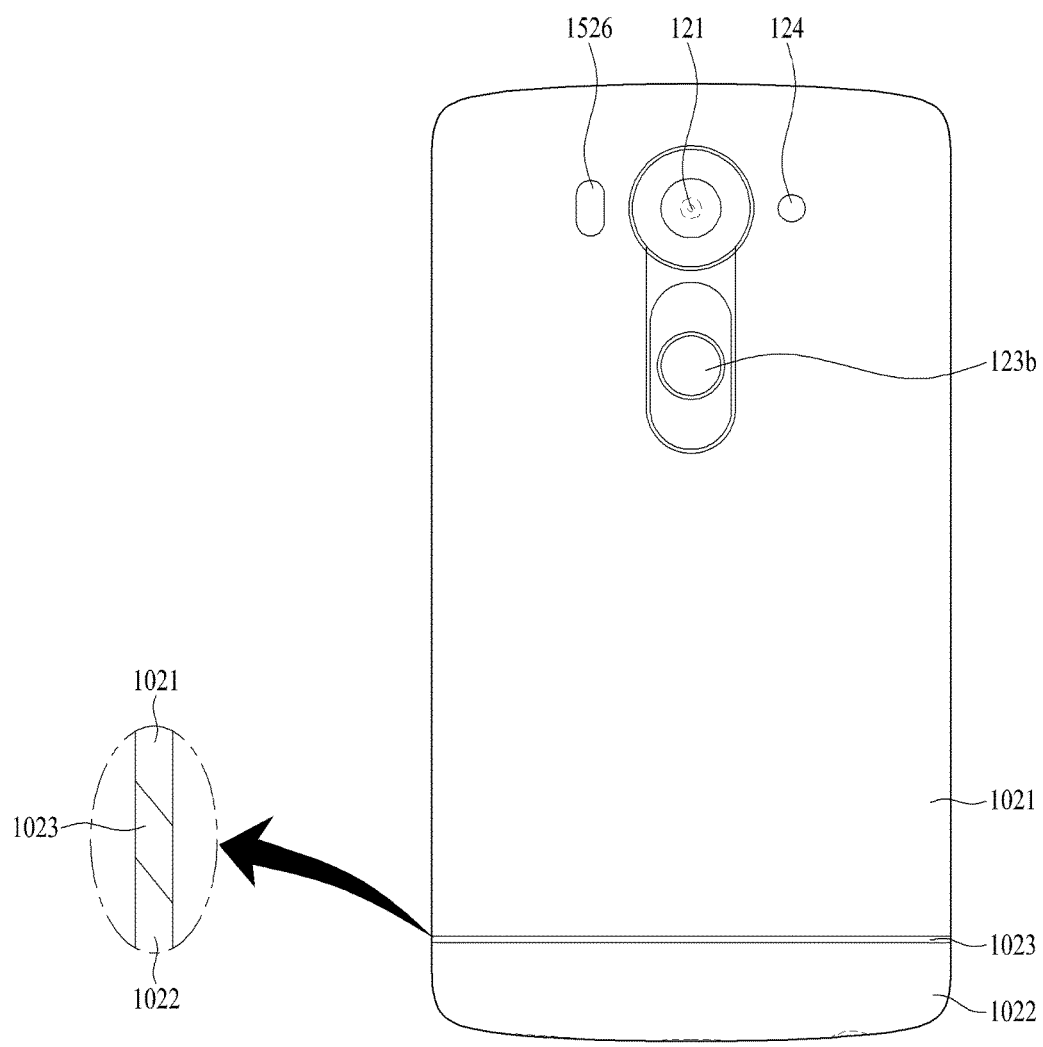

Reference is now made to FIGS. 1A-1C, where FIG. 1A is a block diagram of a mobile terminal in accordance with an embodiment of the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 1D:
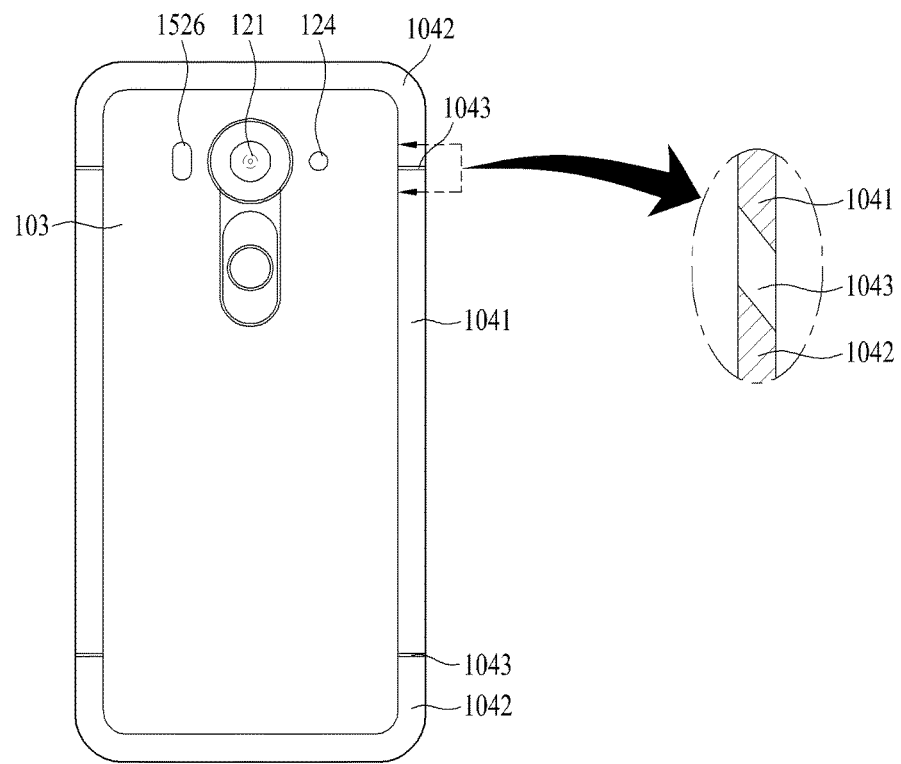
FIG. 1D is a rear view of a modified one of the example, viewed in a back side.

The case 102 of the mobile terminal 100 may include a metallic material. As the display unit 151 is arranged in a front surface of the case, the substantially exposed portion of the case 102 may be one or more of the rear case 102 and the side case (104, see FIG. 1D) covering lateral sides of the mobile terminal. Further, FIG. 1C illustrates the rear case formed of a metallic material, and FIG. 1D illustrates the side case 104 formed of a metallic material.

The metal case enables a clean and neat appearance and metal is welcome as the material for the case 102 and 104. However, the mobile terminal has electronic components mounted therein and all of the rear or lateral surface cannot be formed of metal. That is because electronic components such as an antenna have to transmit and receive an electromagnetic wave. The metal case having the metal rear and lateral surfaces has a poor frequency performance so that the case may include a non-metallic material partially provided together with the metallic material.

Even in case the metallic part of the case 102 and 104 is used as a radiator of the antenna, the length and shape of the metallic part is determined based on characteristics of antenna frequency. Accordingly, the metallic part of the case has to be divided, considering the wavelength and characteristics of the frequency determined to use.

At least one slit is faulted in the metallic part of the related art metal case to divide the metallic part into a plurality of metal parts and a non-conductive material is filled in the slit arranged between the metal parts to form a non-metal part. A gap between each two of the metal parts has to be a predetermined distance or more so that the performance of the antenna can be secured. However, the non-metallic part and the metallic part are formed of different materials and that results in the deterioration of the unity of the exterior design.

To solve the disadvantage of the deterioration, it is shown in one embodiment shown in an enlarged sectional diagram of FIG. 1C that an inclined surface is formed in a lateral side facing a first metallic part 1021 and a second metallic part 1022 and that a non-metallic part 1023 arranged between the first metallic part 1021 and the second metallic part 1022 is formed of a transparent material. Accordingly, the metal parts 1021 and 1022 pass through the transparent non-metallic part 1023 to be visible to the user's eyes.

Figure 2:
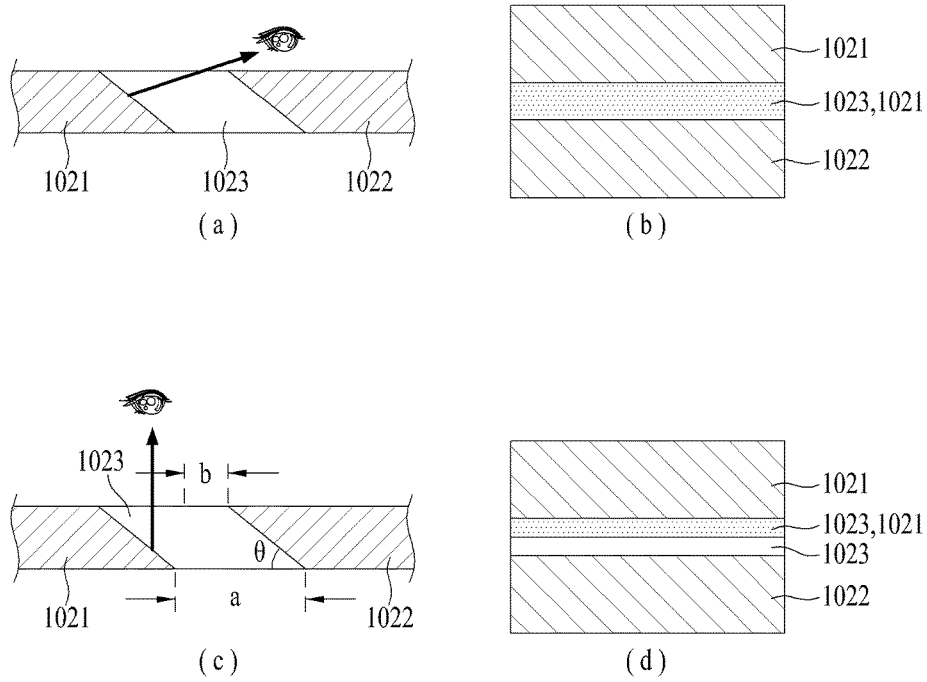
FIG. 2 is a diagram illustrating a profile shown at different angles viewing a non-metal portion of the mobile terminal in accordance with an embodiment of the present disclosure.

FIG. 2 is a diagram illustrating the profile of the non-metallic part 1023 of the mobile terminal, viewed at different angles. When viewing the non-metallic part 1023 from an oblique viewpoint as shown in FIG. 2 (*a*), an inclined surface of the first metallic part 1021 is visible through the transparent non-metallic part 1023 as shown in FIG. 2 (*b*).

The gap between the first metallic part 1021 and the second metallic part 1022 looks the same color as the first and second metal parts 1021 and 1022, so that the first metallic part 1021, the non-metallic part 1023 and the second metallic part 1022 appear like a continuous surface effectively.

When viewing the non-metallic part from a viewpoint shown in FIG. 2 (*c*) or from a viewpoint more to the left in the drawing, the non-metallic part 1023 is visible. As shown in FIG. 2 (*b*), the metal parts 1021 and 1022 are visible through the non-metallic part 1023. Accordingly, the portion where only the non-metallic part is visible seems to look thinner than the related art non-metallic part 1023. The visible gap (b) is narrower than the substantial gap (a) so that the continuous feeling felt by the user for the metal parts 1021 and 1022 is not reduced.

Further, the slope angle (θ) of the inclined surface may be 50°~60°. As the slope angle becomes smaller and smaller, the portion where only the non-metallic part is visible looks narrower effectively. At this instance, a linear distance between the metal parts 1021 and 1022 can be shorter and the slope angle and the gap between the first metallic part 1021 and the second metallic part 1022 can be determined at a level that does not hamper the performance of the antenna.

FIG. 1D is a rear view of a modified example, viewed in a back side. When a side case 104 provided in the lateral side of the mobile terminal is formed of metal, the side case 104 can include a plurality of metal parts 1041 and 1042 and a non-metallic part 1043. The metal parts 1041 and 1042 and the non-metallic part 1043 provided in the side case 104 also achieve the same effect as the portions mentioned above, so that the exterior design with unity can be provided.

Figure 3:
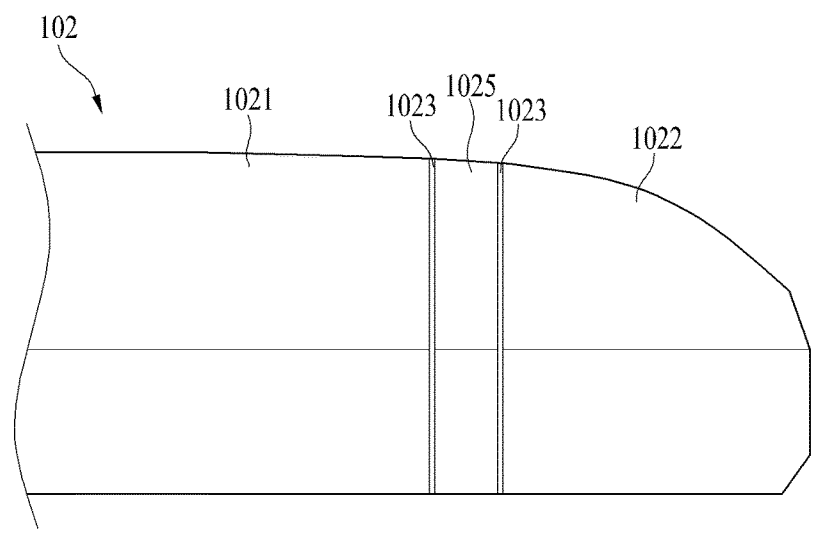
FIG. 3 includes a lateral view and a sectional view illustrating a second example of the mobile terminal.
Figure 3:
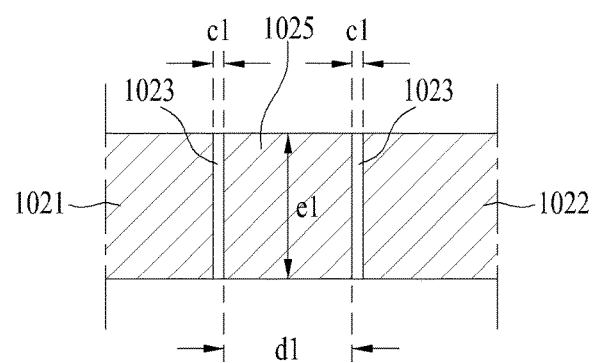

Next, FIGS. 3(*a*) and (*b*) include a lateral view and a sectional view illustrating a second example of the mobile terminal. In this embodiment, a floating metallic part 1025 formed of the same material used for the metal parts 1021 and 1022 is further provided in the non-metallic part 1023 arranged between the pair of the metal parts 1021 and 1022. The flowing metallic part has a narrow width and it has no effect of electromagnetic wave interception. Accordingly, even when the floating metallic part 1025 is disposed as shown in FIG. 3, the performance of the antenna can be achieved up to a point.

In this instance, the gap between the first metallic part 1021 and the second metallic part 1022 can be widened and that brings a positive aspect to the performance of the antenna. In other words, when the sum (d1+c1+c1) of the width (d1), the gap (c1) between the floating metallic part 1025 and the first metallic part 1021 and the gap (c1) between the floating metallic part 1025 and the second metallic part 1022 is wider than the gap between the related metal parts 1021 and 1022, the floating metallic part 1025 makes the case look like a continuous metal case.

Further, as shown, the non-metallic part 1023 can be formed between the first metallic part 1021 and the floating metallic part 1025 and between the floating metallic part 1025 and the second metallic part 1022. A non-metallic material such as an adhesive or an injection mold can also be filled in the non-metallic part 1023.

In addition, the gap (d1+c1+c1) between the first metallic part 1021 and the second metallic part 1022 may be 1.8 mm and the floating metallic part 1025 disposed between the first and second metal parts 1021 and 1022 may be 1.6. In this instance, the gap (e1) between the floating metallic part 1025 and the first metallic part 1021 and between the floating metallic part 1025 and the second metallic part 1022 can be only 0.1 mm. Accordingly, the exterior design is not hampered.

Figure 6:
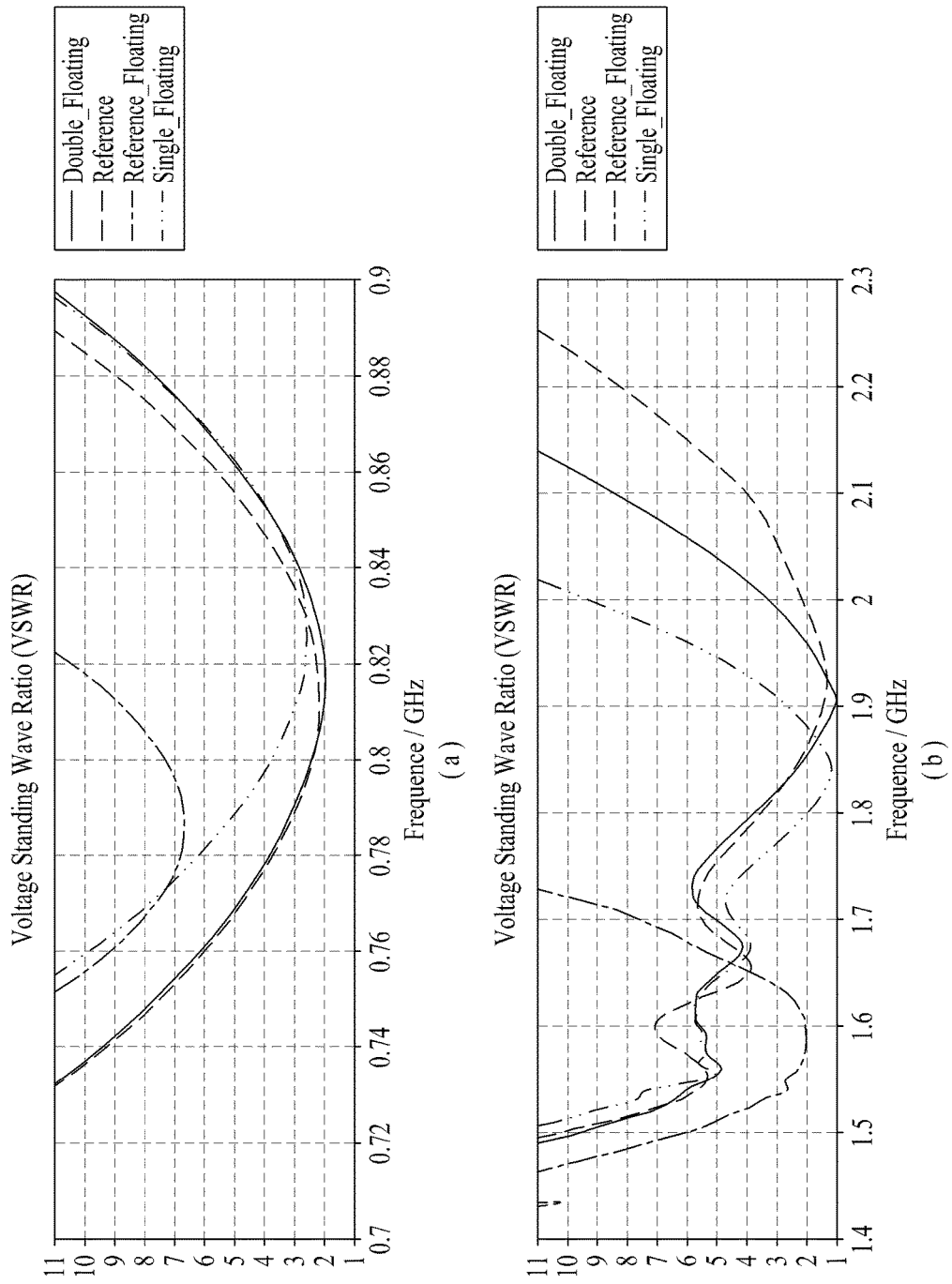
FIG. 6 is a graph showing VSWR (Voltage Standing Wave Ratio) of the mobile terminal.

Next, FIG. 6 is a graph showing VSWR (Voltage Standing Wave Ratio) of the mobile terminal. The X-axis of the graph means frequency and (a) means a low frequency band (0.7 GHz~0.9 GHz) and (b) means a high frequency band (1.4 GHz~2.3 GHz). Y-axis means VSWR (Voltage Standing Wave Ratio) and VSWR means a ratio of the amplitude at the maximum voltage to the amplitude at the minimum voltage. As the ratio is getting smaller, it can be seen that the performance of the electromagnetic wave is getting better. The frequency band used in LTE communication is from 0.79 GHz to 0.84 GHz at a low frequency band and around 1.9 GHz, so that it needs to control VSWR low in the range of the frequencies. In other words, VSWR has to be low in resonant frequencies.

Further, the reference graph means the performance gained in the structure that consists of the first metallic part 1021 having a linear end, the second metallic part 1022 spaced apart a distance of 1 mm from the first metallic part 1021 and the non-metallic part 1023 disposed between the first metallic part 1021 and the second metallic part 1022.

The reference floating graph illustrates the performance of the structure shown in FIG. 3. In the structure, the gap (c1) between the floating metallic part 1025 and the first metallic part 1021 and between the floating metallic part 1025 and the second metallic part 1022 is 0.1 mm and the width (d) of the floating metallic part 1025 is 1.6 mm. The reference floating graph illustrates the antenna performance of the mobile terminal 100 including the case 102 with the structure mentioned above.

In the reference floating graph, the VSWR is low in a different frequency band from the frequency band in the reference graph where the VSWR is low. When the width of the floating metallic part 1025 or the gap between the floating metallic part 1025 and the first metallic part 1021 or the second metallic part 1022 is adjusted, the graph changes and the VSWR is lowered in a desired frequency band.

Figure 4:
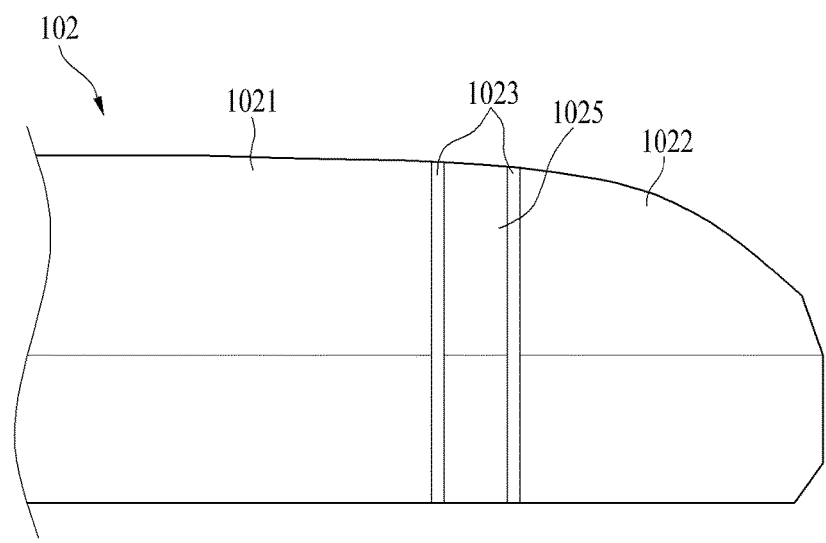
FIG. 4 includes a lateral view and a sectional view illustrating a third example of the mobile terminal.
Figure 4:
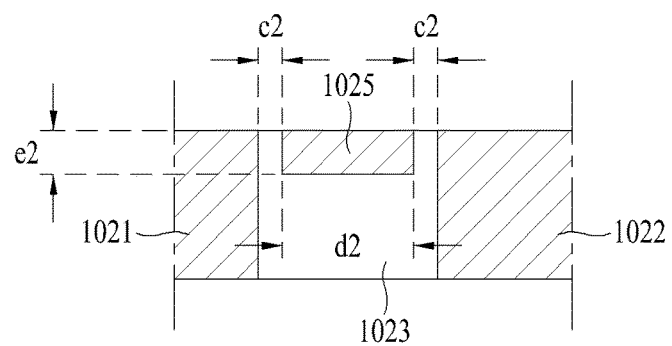

FIGS. 4(a) and (b) include a lateral view and a sectional view illustrating a third example of the mobile terminal. The VSWR of the reference floating graph is different from the VSWR of the reference graph. Accordingly, the performance of the frequency can be adjusted by adjusting the size of the floating metallic part 1025. The thickness (e2) of the floating metallic part 1025 is formed small as shown in the embodiment shown in FIG. 4, only to minimize the effect on the performance of the antenna and to maintain the exterior design shown in FIG. 3 simultaneously.

At this time, the non-metallic part 1023 is provided in an inner lateral surface of the floating metallic part 1025 and it supports the floating metallic part 1025 and the first and second metal parts 1021 and 1022 to form the continuous surface. The non-metallic part 1023 may be double-injection-molded together with the floating metallic part 1025 and the first and second metal parts 1021 and 1022. For the harder structure, the non-metallic part 1023 can be formed to cover an inner lateral surface of the rear case 102. In other words, the non-metallic part 1023 can be extended to the inner lateral surfaces of the first and second metal parts 1021 and 1022.

When the width (d2) of the floating metallic part 1025 is 1.6 mm and the gap (c2) between the first metallic part 1021 and the floating metallic part 1025 is 0.3 mm and the thickness (e2) of the floating metallic part 1025 is 0.5 mm, the performance of the metal parts is shown in FIG. 6 illustrating a single floating graph. Compared with the embodiment shown in FIG. 3, the single floating graph is similar to the reference graph in the low frequency band. At this time, the single floating graph shows a larger value with respect to signals of 1.9 GHz or more in the high frequency band than the reference graph. When a signal in the high frequency band is transmitted and received, the performance is deteriorated a little bit.

Next, FIGS. 5(a) and (b) include a lateral view and a sectional view illustrating a fourth example of the mobile terminal. To improve the performance, the floating metallic part 1025 can be divided into a plurality of parts. The floating metallic part 1025 can be smaller and the performance of the antenna can be improved. In the drawing, two floating metal parts 1025 are shown and the number of the floating metal parts 1025 can be increased. Different colors can also be provided to the floating metal parts 1025 to achieve a design effect.

Figure 5:
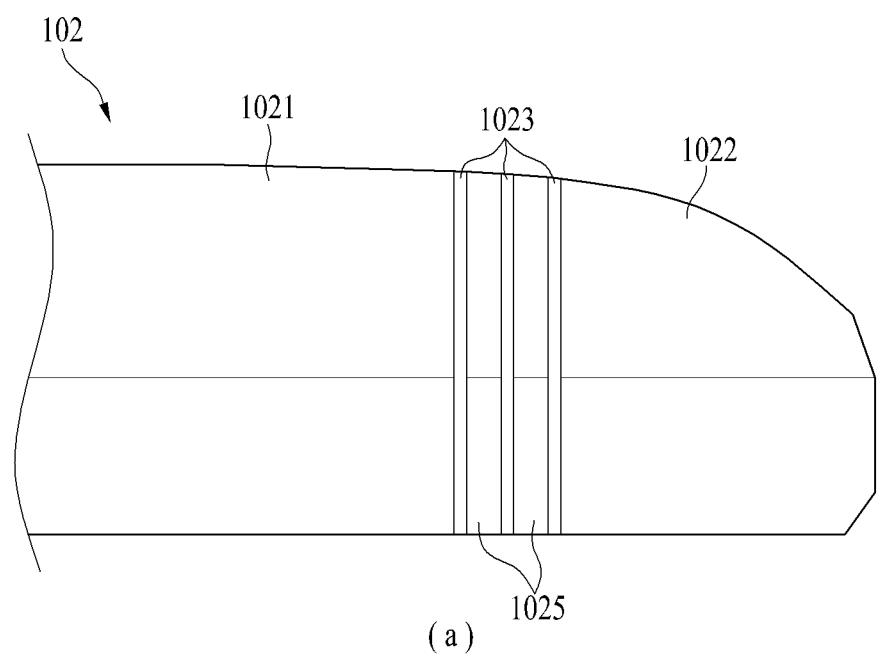
FIG. 5 includes a lateral view and a sectional view illustrating a fourth example of the mobile terminal.
Figure 5:
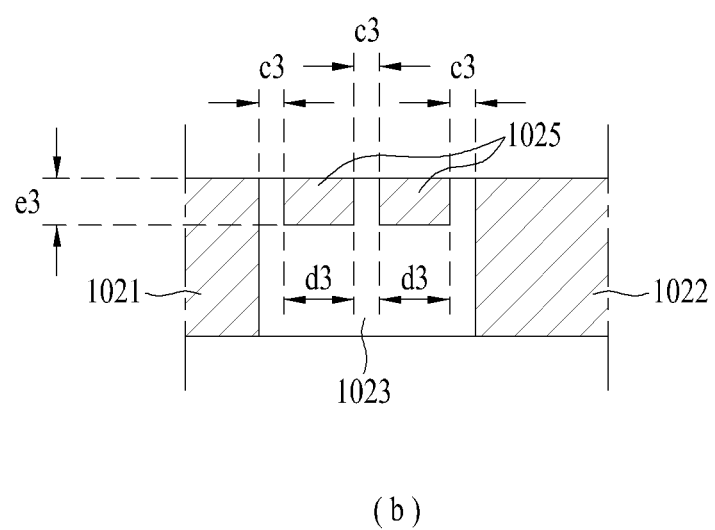

Next, FIG. 6 is a double floating graph showing the performance of the antenna when the width (d3) of the floating metallic part 1025 is 0.8 mm and the gap between the first metallic part 1021 and the floating metallic part 1025 is 0.3 mm and the thickness (e2) is 0.5 mm. The double floating graph showing the performance of the antenna, when using the case including the plurality of the floating metal parts 1025 to make the width of each floating metallic part 1025 narrow as shown in FIG. 5, is more similar to the reference graph than to the single floating graph. In other words, the performance of the antenna is improved in a frequency band of 1.9 GHz or more.

Figure 7:
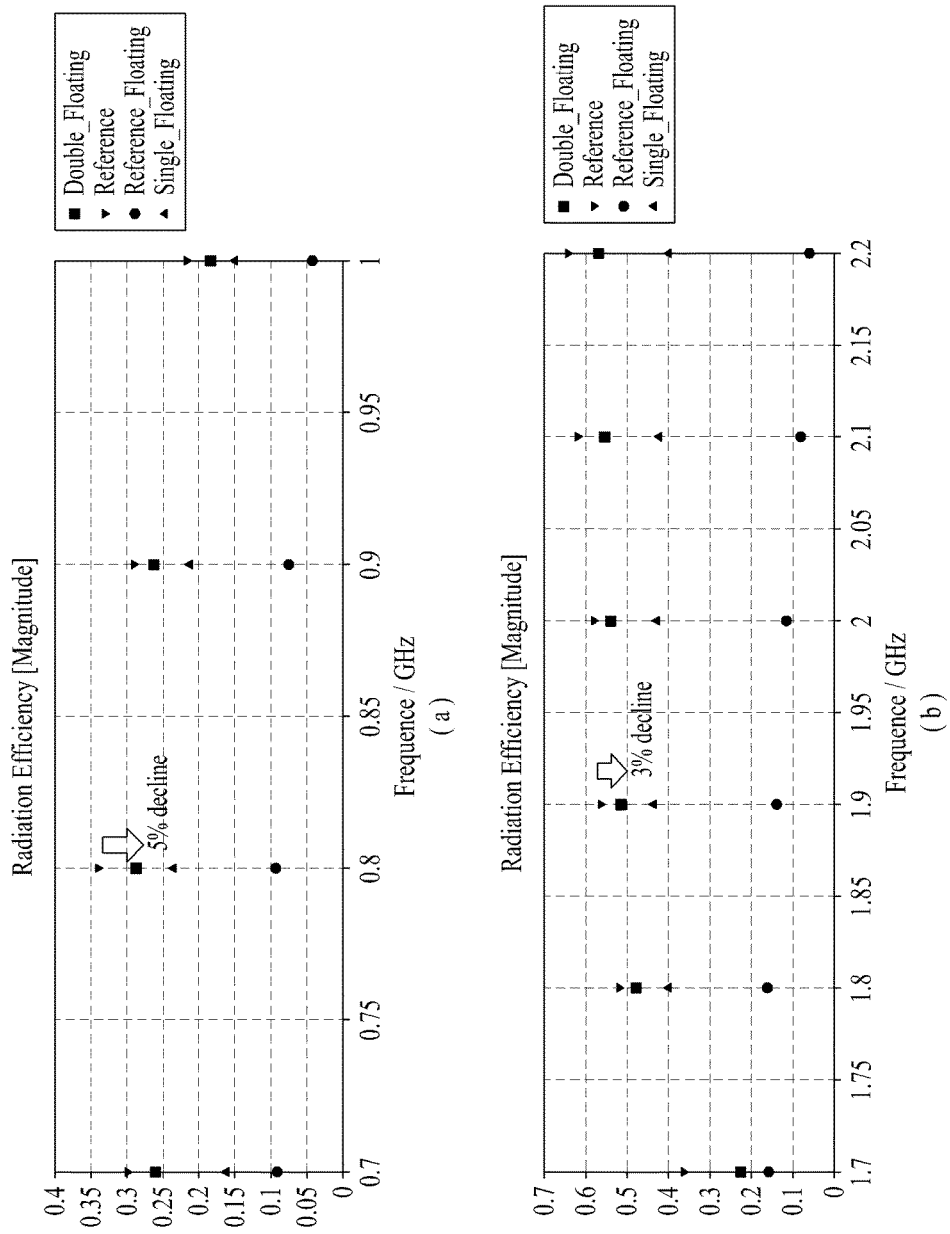
FIG. 7 is a graph showing radiation efficiency of the mobile terminal.

Next, FIGS. 7(a) and (b) are graphs showing radiation of the mobile terminal. The X-axis means a frequency. In particular, FIG. 7(a) means the radiation efficiency in the low frequency band and FIG. 7(b) means the radiation efficiency in the high frequency band. Further, the Y-axis means a relative value and it can be seen that radiation has less interference as the relative value is getting larger.

The performance of the case in accordance with an embodiment of the present disclosure is deteriorated a little bit in a frequency band of 0.8 GHz in the low frequency band. However, double floating is deteriorated by only 5%, compared with the reference, so that such deterioration of the performance may not have a decisive influence on actual communication performance. Further, double floating is deteriorated by only 3% in a frequency band of 1.9 GHz in the high frequency band, compared with the reference, so that the performance with the double floating substantially similar to the reference can be gained.

As mentioned above, the mobile terminal in accordance with an embodiment of the present disclosure can keep the design continuity generated by the non-metallic part 1023, even when using the metal case having the non-metallic part 1023 arranged between the metal parts 1021 and 1022. In addition, different colors and materials are used in the floating metallic part 1025 provided between the metal parts 1021 and 1022. Accordingly, an effect in a design aspect can be gained.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
   a case;
   a display unit arranged in a front of the case; and
   a wireless communication unit mounted in the case and configured to provide wireless communication,
   wherein the case comprises:
   a first metallic part;
   a second metallic part spaced apart a predetermined distance from the first metallic part;
   a floating metallic part provided between the first metallic part and the second metallic part, the floating metallic part comprising a plurality of parts spaced apart from each other; and
   a non-metallic part provided between the first metallic part and the second metallic part,
   wherein the floating metallic part is spaced apart a predetermined distance from the first metallic part and the second metallic part,
   wherein the non-metallic part is provided between the first metallic part and the floating metallic part, between the floating metallic part and the second metallic part, and between every two adjacent ones of the plurality of parts,
   wherein a first end of the first metallic part and a second end of the second metallic part face each other and each of the first end and second end has a first thickness in a direction from an inner surface of the case to an outer surface of the case, and
   wherein each of the plurality of parts has a second thickness smaller than the first thickness.

2. The mobile terminal of claim 1, wherein the floating metallic part is spaced apart 0.3 mm or more from the first metallic part and the second metallic part.

3. The mobile terminal of claim 1, wherein a gap between the first metallic part and the floating metallic part and a gap between the floating metallic part and the second metallic part are uniform, and
   wherein a border between the first metallic part and the floating metallic part is parallel to a border between the floating metallic part and the second metallic part.

4. The mobile terminal of claim 1, wherein a color of the floating metallic part is different from a color of the first and second metallic parts.

5. The mobile terminal of claim 1, wherein different colors or materials are used in the plurality of parts, respectively.

6. The mobile terminal of claim 1, wherein the non-metallic part is extended to inner lateral surfaces of the first metallic part, the second metallic part and the floating metallic part.

7. The mobile terminal of claim 1, wherein the non-metallic part comprises a transparent material.

* * * * *